S. JOHNSON.
RIM TOOL.
APPLICATION FILED SEPT. 19, 1921.
1,420,927.  Patented June 27, 1922.
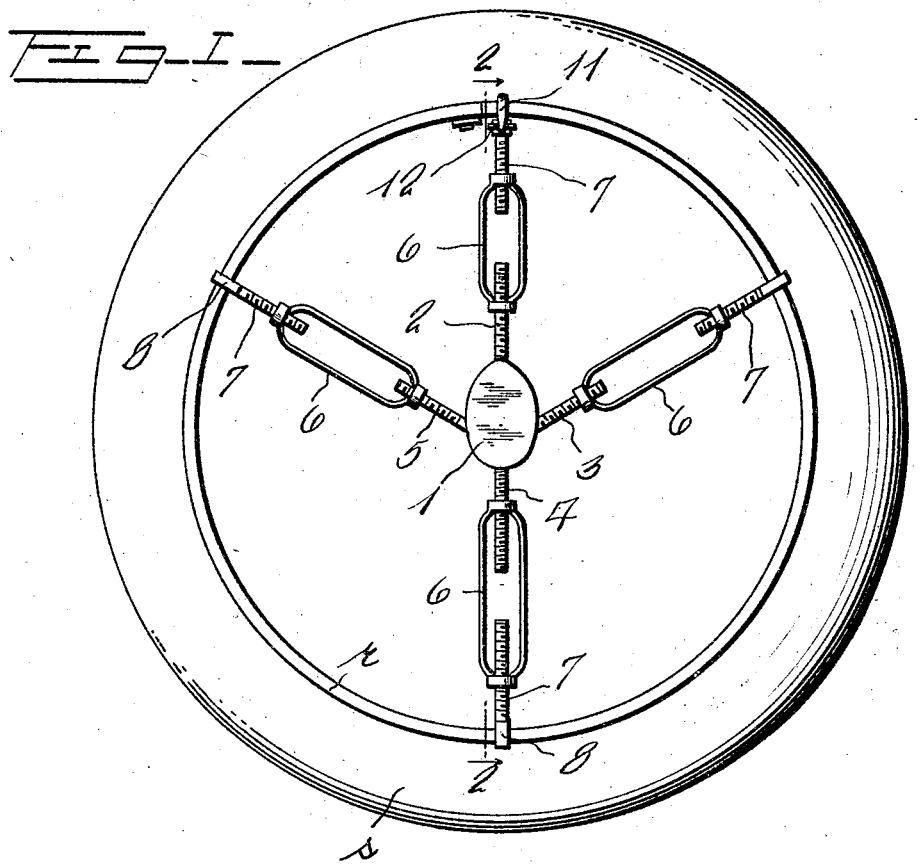
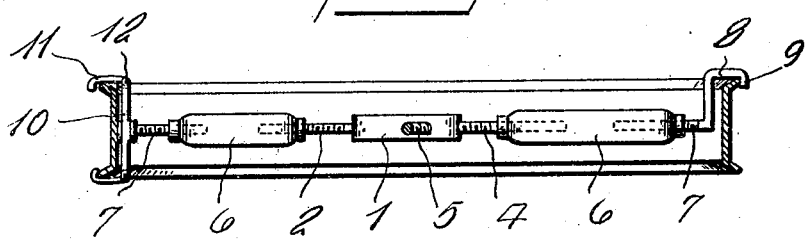
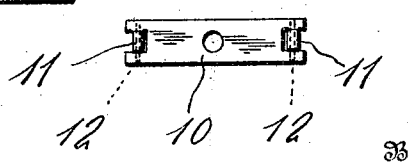
Inventor
S. Johnson
By William C. Linton
Attorney

UNITED STATES PATENT OFFICE.

STONEWALL JOHNSON, OF SULLIVAN, ILLINOIS.

RIM TOOL.

1,420,927.  Specification of Letters Patent.  Patented June 27, 1922.

Application filed September 19, 1921. Serial No. 501,753.

*To all whom it may concern:*

Be it known that I, STONEWALL JOHNSON, a citizen of the United States, residing at Sullivan, in the county of Moultrie and State of Illinois, have invented certain new and useful Improvements in Rim Tools; and I do hereby declare that the following is a full, clear, and concise description of the same, such as will enable others skilled in the art to which it appertains to make and use the same.

This invention relates to improvements in rim tools having for an object to provide a rim tool which may be effectually used in the so termed "breaking" of demountable rims whereby to permit of the free removal of a tire shoe therefrom, and also, for the spreading of the rim as when a tire shoe is placed upon the same and it is then desired to expand the rim so that the adjacent end of the transversely divided portion thereof can be positively interengaged and the rim then placed upon a wheel.

It is also an object of the invention to provide a tool of the character mentioned having novel forms of engaging means, so constructed as will permit the tool to be firmly engaged with a rim and held against lateral displacement with relation thereto, but yet, permit of rotary or limited lateral adjustment of the same with relation to said rim during a "breaking" or spreading operation.

Other objects will be in part obvious and in part pointed out hereinafter.

In order that the invention and its mode of operation may be readily understood by persons skilled in the art, I have in the accompanying illustrative drawings and in the detailed following description based thereon set out one embodiment of the same.

In these drawings:

Figure 1 is a side elevation of the tool showing the same engaged with the demountable rim of a pneumatic tire shoe;

Figure 2 is a vertical section therethrough taken on the line 2—2 of Figure 1; and, Figure 3 is an end view of the adjustable rim engaging jaw.

Having more particular reference to the drawings, in connection with which like characters of reference will designate corresponding parts throughout, I have shown, for purposes of illustration, my improved tool used in connection with the demountable rim *r* of a pneumatic tire shoe *s*, it being understood that the type of the rim *r* corresponds to that form of device commonly known as a demountable rim, particularly designed for use in connection with automobile wheels.

The improved tool may be stated to comprise a central substantially oval shaped body portion 1 having a plurality of relatively angularly disposed screw threaded rods 2, 3, 4 and 5 extending therefrom, it being noted in this connection that the rods 2 and 4 are in longitudinal alignment, while the screw threaded rods 3 and 5 are arranged in diverging fashion with respect to the body portion 1. These rods 2, 3, 4 and 5 are immovably mounted upon the central body portion 1 and receive thereover the adjacent ends of turn buckles generally indicated by the numeral 6, which turn buckles in turn, have their outer or remaining ends turned into engagement with the inwardly disposed screw threaded shanks 7. Thus, it will be understood that upon clockwise rotation of the various turn buckles 6, the screw threaded shanks 7 will be caused to be drawn inwardly toward the central body portion 1 and upon counter clockwise motion of said turn buckles, said screw threaded shanks 7 will be caused to move outwardly from the central body portion 1.

Certain of the screw threaded shanks 7 have substantially right angularly formed arms 8 formed upon their outer extremities as clearly shown in the Figure 2, the outer or free ends of these arms being, in turn, formed with inwardly disposed right angular fingers 9 whereby connection between the arms and an adjacent portion of the demountable rim *r* may be effected.

The remaining screw threaded shank 7 is swivelly connected to a bar 10, intermediate its ends, which bar, in turn, has hooked engaging fingers 11 pivotally mounted upon its opposite extremities as at 12 and adapted to embrace the opposite sides of the adjacent portions of the demountable rim *r* and thereby engage over the marginal portions of said rim as is clearly shown in the Figure 2, thus constituting what may be rightfully termed as an adjustable jaw.

In use of my improved rim tool, when it is desired to "break" a demountable rim such as indicated by *r*, in the drawing, the adjustable jaw of the device is engaged with the opposite marginal portions of the rim whereupon the right angular arms 8 with their respective fingers 9 are moved into engagement with adjacent portions of said rim. At this time, the various turn buckles 6 are rotated in a clockwise fashion and cause retraction or inward movement of the various screw threaded shanks 7. When the various right angular arms 8 and the adjustable jaw have been firmly engaged with the adjacent portions of the rim $r$, the turn buckle 6 connecting the adjustable jaw to the screw threaded rod 2 is rotated farther in a clockwise direction and by consequence, will exert an inward pull upon one end of the transversely divided portion of such rim, thereby "breaking" the same and causing said rim to assume its contracted position, whereupon the tire shoe may be readily removed therefrom. It is of course, to be understood that in some instances it will be necessary to spread the demountable rim $r$ slightly in order that the interlocked ends of the same may be disengaged, so that that end portion of the same engaged by the adjustable jaw may be afforded free inward movement with the exerting of an inward pull upon the same. This is preferably effected by turning the turn buckles 6 connected to the screw threaded rods 3 and 5 in a counter clockwise direction, which action, as will be understood, will cause the transversely divided end portions of the demountable rim to be forced apart. At this time, the turn buckle 6 connected to the screw threaded rod 2 of the adjustable jaw may be turned or rotated in a clockwise direction and thus impart an inward pull to that end portion of the rim engaged by the adjustable jaw. When said end of the rim has been moved inwardly for a distance sufficient to permit the same to clear the opposite end, the turn buckle 6 connecting the right angular arms 8 with the screw threaded rods 3 and 5 may be then rotated in a clockwise direction in order that contraction of the demountable rim will be permitted.

In using the tool to spread rims and to reengage the adjacent ends of the same whereby they will be interlocked, previous to the placing of the rim upon a vehicle wheel, the turn buckles 6 connecting the right angular arms 8 with the screw threaded rods 3 and 5 are rotated in a counter clockwise direction, causing the opposite portions of the demountable rim to be spread sufficiently so that the extremities of the same will clear each other. At this time, the turn buckles 6 connecting the remaining right angular arm 8 with the screw threaded rod 4 and the adjustable jaw with the screw threaded rod 2 are rotated in a counter clockwise direction, thus forcing outwardly upon the rim and causing the interengageable ends of the rim to assume such position whereat they will have proper engagement. At this time, the turn buckles 6 connected to the rods 3 and 5 are rotated in a clockwise direction, thus relieving the adjacent portions of the rim $r$ of the outward stress, and by consequence, permitting the adjacent ends of the transversely divided portion thereof to be interengaged.

From the foregoing, it will be understood that I have provided a simple but effectual form of rim tool for either "breaking" or spreading of a demountable rim whereby to permit of the removal or replacement of a tire shoe thereupon in but a minimum amount of time and with but little effort. By reason of the adjustability of the jaw constituted by the bar 10 with its pivoted fingers 11, it will be understood that means are provided for firmly connecting the tool to a demountable rim and securing the same against lateral displacement during its use. Furthermore, rotary adjustment of the remaining portions of the tool subsequent to engagement of the adjustable jaw with the demountable rim $r$ may be effected due to the swivel connection between said jaw and its respective screw threaded shank 7. Thus, the engagement of the tool with a demountable rim will be materially facilitated.

Manifestly, the construction shown is capable of considerable modification and such modification as is within the spirit of my invention, I consider within the spirit of my claim.

I claim:

A rim tool comprising a central body portion, a pair of screw threaded rods rigidly connected to said central body portion at diametrically opposite points and extending in relative longitudinal alignment, a second pair of screw threaded rods rigidly secured between the aforesaid rods to the central body portion and extending in diverging fashion from the opposite sides thereof, turn-buckles engaging the screw threaded rods, screw threaded shanks engaging the outer extremities of said turn buckles, a bar swively connected between its ends to the rod positioned between the diverging rods, fingers pivoted to the opposite ends of said bar, and right angularly formed arms arranged on the outer extremities of the remaining shanks for the purpose set forth.

In witness whereof I have hereunto set my hand.

STONEWALL JOHNSON